United States Patent [19]

Lisker

[11] Patent Number: 5,105,726
[45] Date of Patent: Apr. 21, 1992

[54] PORTABLE UNIVERSAL COOKING GRILL

[76] Inventor: Mikhail Lisker, 201 West End Ave., Brooklyn, N.Y. 11235

[21] Appl. No.: 564,795

[22] Filed: Aug. 9, 1990

[51] Int. Cl.$^5$ ............................................. A47J 33/00
[52] U.S. Cl. ...................................... 99/340; 99/419; 99/449; 99/450
[58] Field of Search ............. 99/449, 419, 421 A, 99/421 HH, 421 H, 421 R, 339, 340, 480, 482, 481, 473; 126/25 R, 9 R, 25 M; 220/6, 7

[56] References Cited

U.S. PATENT DOCUMENTS

| | | |
|---|---|---|
| 2,419,674 | 3/1947 | Caplan . |
| 2,827,846 | 4/1958 | Karkling . |
| 2,842,044 | 12/1958 | Kirk . |
| 2,917,039 | 12/1959 | Sheedlo ........................... 126/9 R |
| 3,064,637 | 11/1962 | Thomson . |
| 3,101,080 | 2/1963 | Lorbacher . |
| 3,179,104 | 4/1965 | Chapman ........................ 126/9 R |
| 3,199,438 | 8/1965 | Myler ............................ 99/421 H |
| 3,330,204 | 3/1967 | Little . |
| 3,641,922 | 3/1972 | Nachazel et al. . |
| 3,800,777 | 10/1974 | Gebien . |
| 3,858,495 | 1/1975 | Gotwalt ............................. 99/449 |
| 4,106,473 | 8/1978 | Wandel .......................... 126/25 R |
| 4,208,959 | 3/1980 | Schmidt . |
| 4,226,177 | 4/1980 | Schmidt . |
| 4,508,096 | 4/1985 | Slattery . |
| 4,526,158 | 6/1985 | Lee . |
| 4,569,327 | 2/1986 | Velton ............................. 126/9 R |
| 4,598,690 | 7/1986 | Hsu ................................ 126/25 R |
| 4,627,410 | 9/1986 | Jung . |
| 4,800,865 | 11/1989 | Setzer . |
| 4,889,972 | 11/1989 | Chang . |
| 4,938,202 | 7/1990 | Hait ................................... 126/9 R |

FOREIGN PATENT DOCUMENTS

| | | | |
|---|---|---|---|
| 1429039 | 3/1965 | France ................................ 220/6 |
| 262857 | 12/1926 | United Kingdom ............. 126/9 R |
| 2045064 | 3/1979 | United Kingdom ............. 126/9 R |

Primary Examiner—Timothy F. Simone
Assistant Examiner—Terrence R. Till

[57] ABSTRACT

A portable cooking grill has a bottom wall and side and end walls which are hinged to the bottom wall to form an open box or enclosure which can be collapsed by moving the walls proximate to the bottom wall. One pair of walls is provided with mating, multi-stepped slots which can support a grill tray or a deep tray or skewers at different levels. Flat leaf or blade springs automatically open the grill from the collapsed condition when a locking mechanism is opened. Folding legs are mounted on the grill or a support tray can be used where the grill is formed integrally from a blank of semi-rigid material which is heat and fire resistant. The grill is universal and can readily be used with many fuels, including coal, wood, gas and electricity, and can be used to cook by broiling, baking, boiling of liquid foods (e.g. soup), frying and the like. Both solid and non-solid foods can be prepared in a simple and convenient manner at home or while traveling. The box or enclosure can be made from an inexpensive blank, made from a fire-proof material, which can be disposed of after one or a few uses.

20 Claims, 8 Drawing Sheets

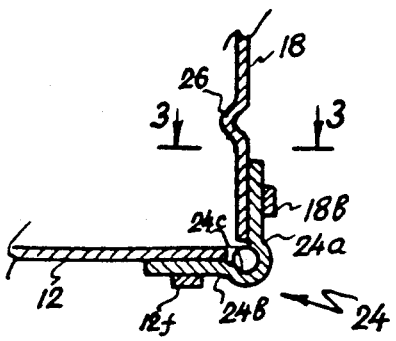
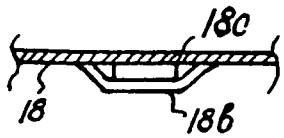
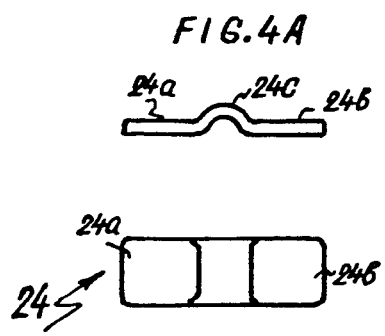
FIG.2   FIG.3   FIG.4B
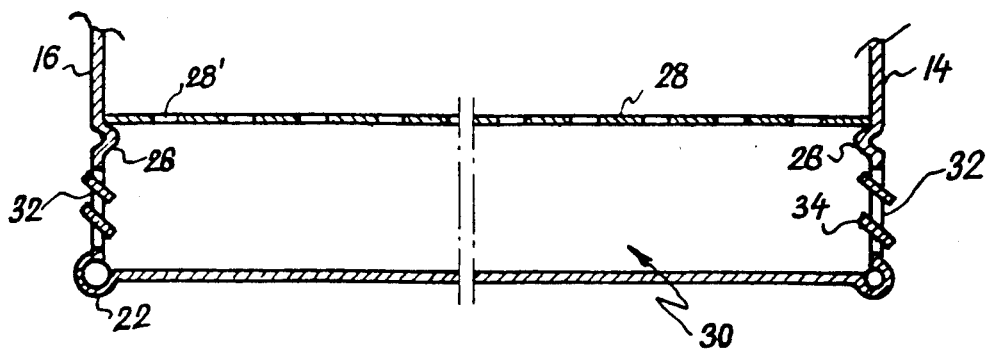
FIG.5
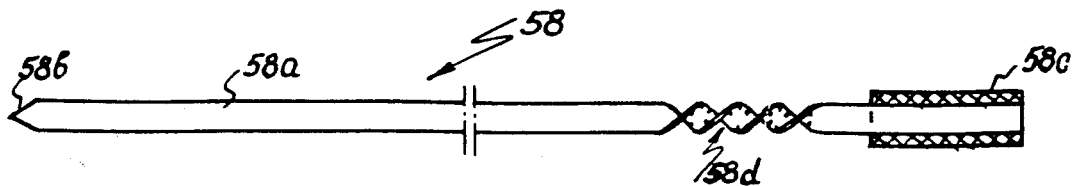
FIG.6A
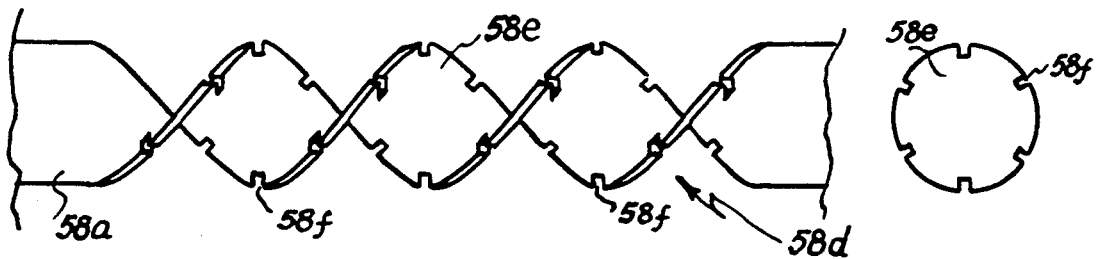
FIG.6B   FIG.6C

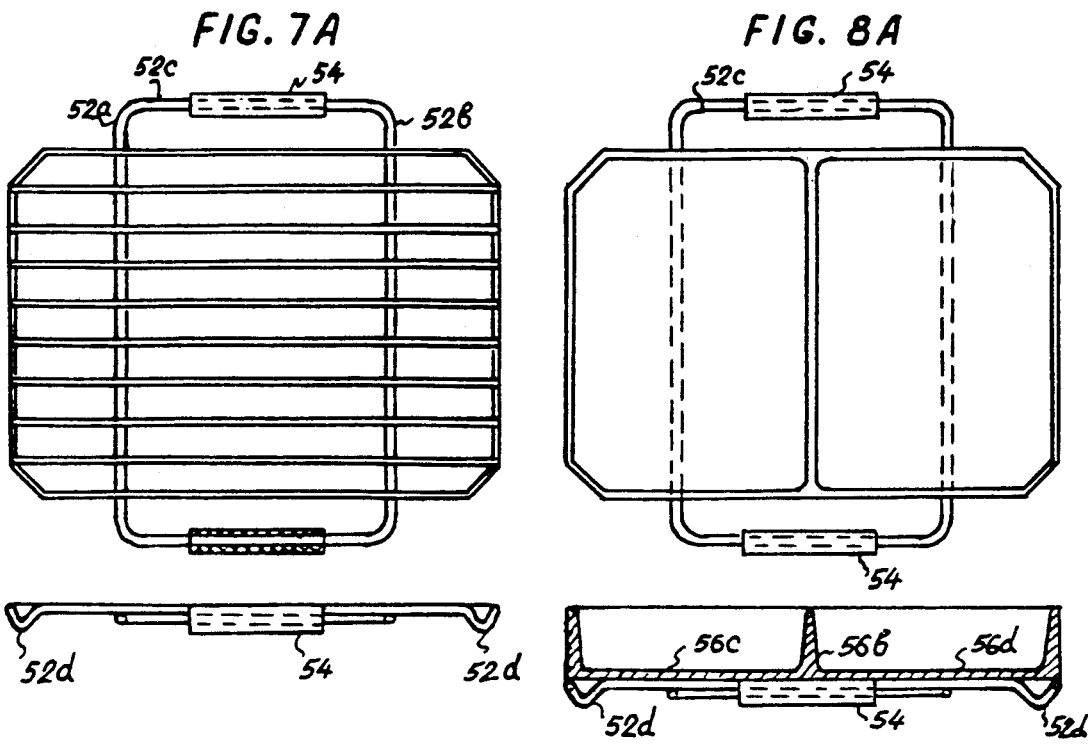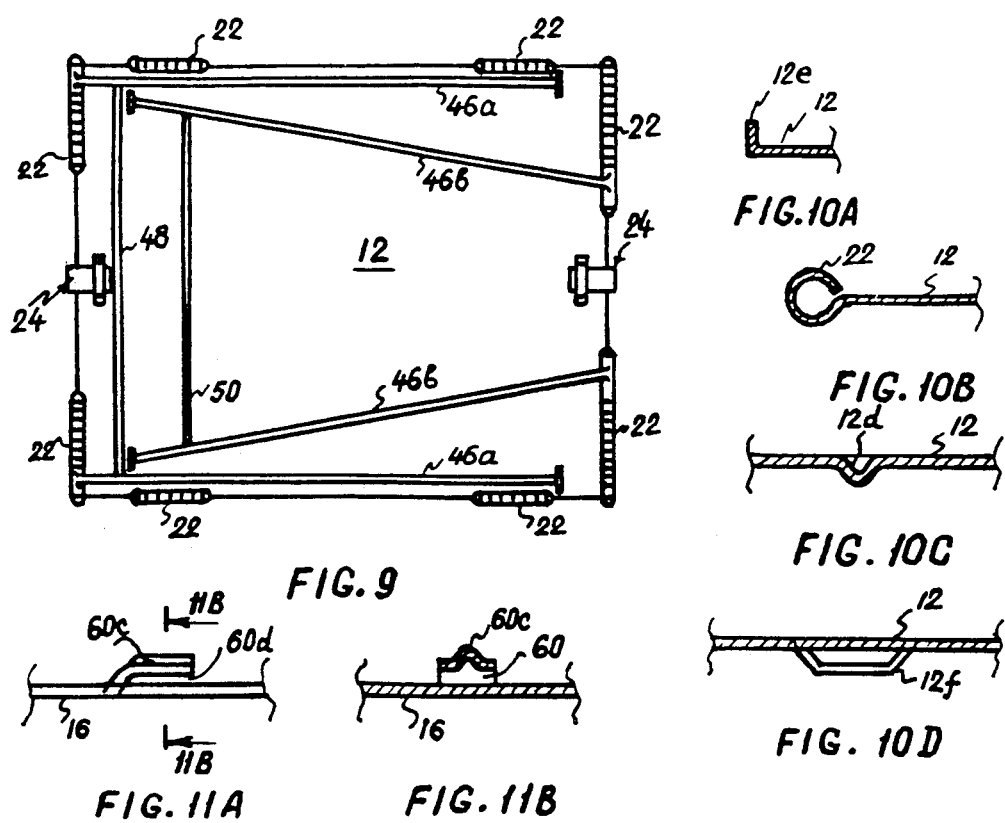

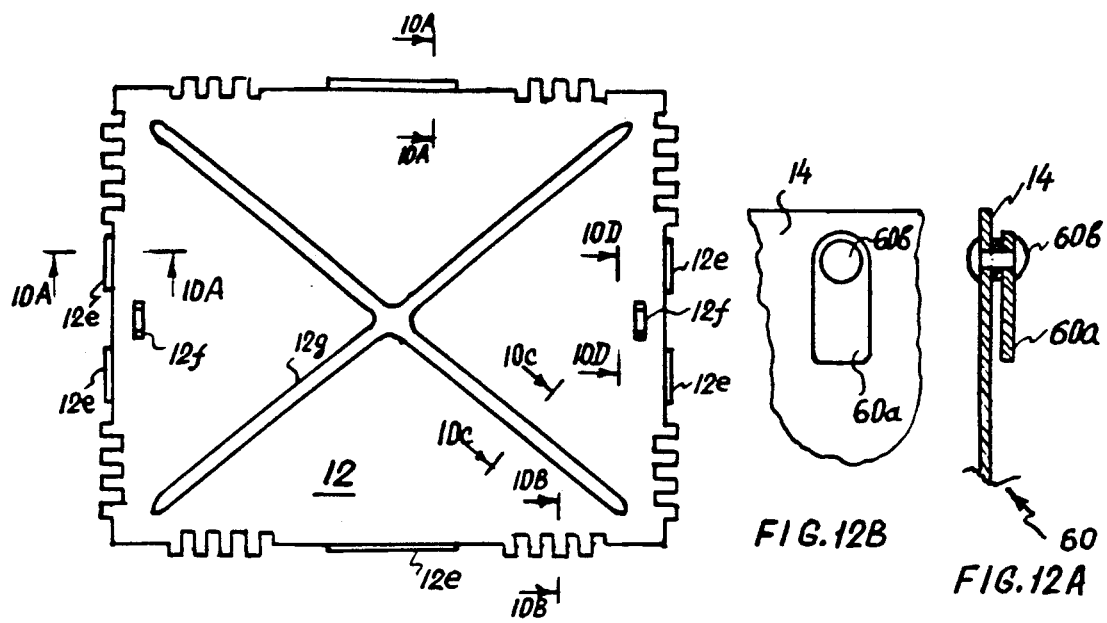
FIG. 10
FIG. 12B
FIG. 12A
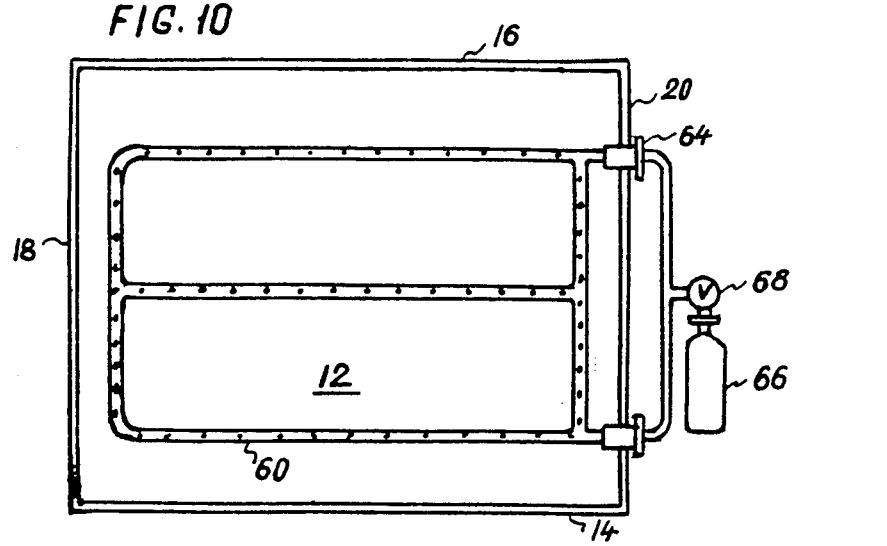
FIG. 13A
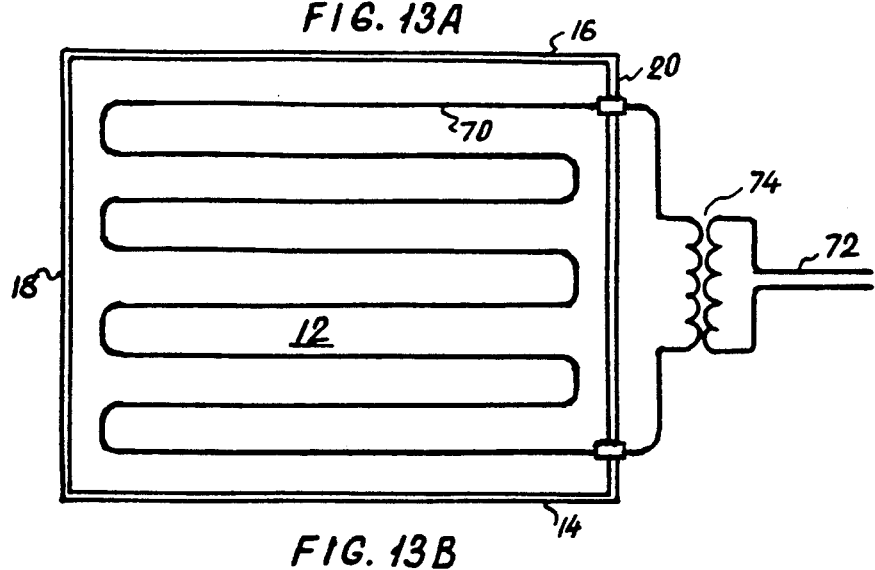
FIG. 13B

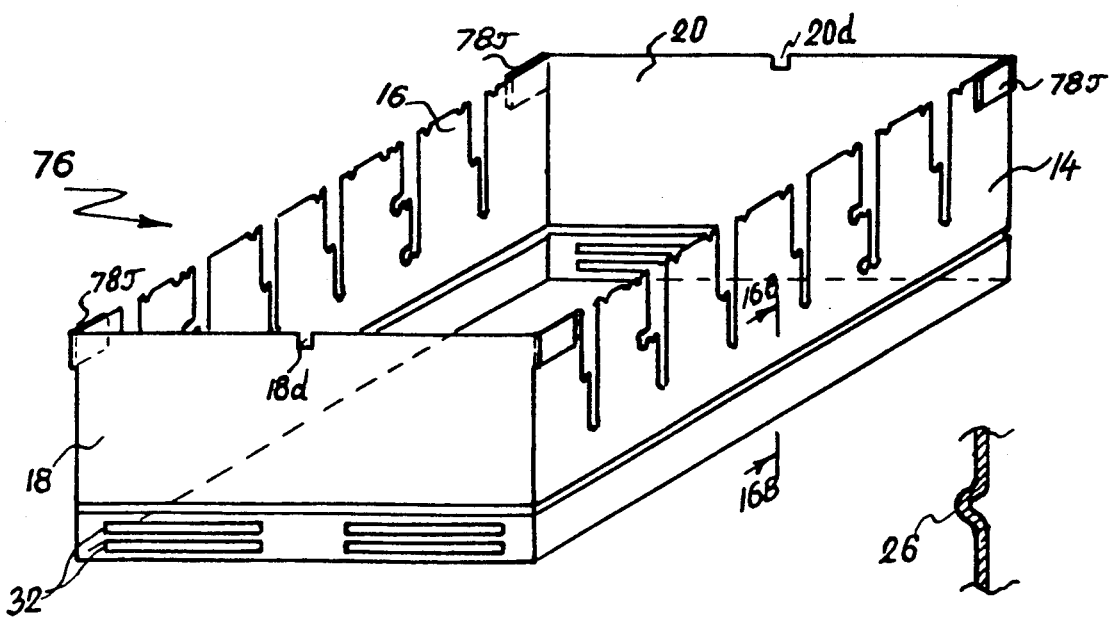
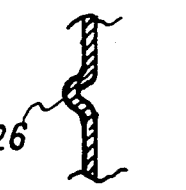
FIG. 16A  FIG. 16B
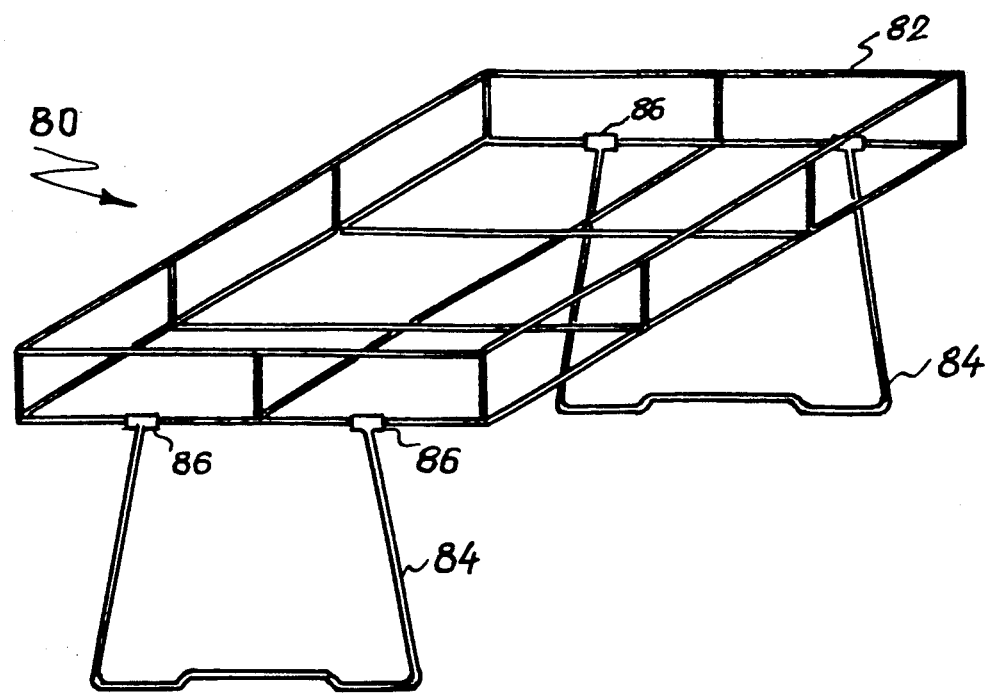
FIG. 17

PORTABLE UNIVERSAL COOKING GRILL

BACKGROUND OF THE INVENTION

1. Field of the Invention

The invention generally relates to cooking apparatus, and more particularly to a portable universal cooking grill which is inexpensive, lightweight and can quickly and easily be folded into an extremely compact unit for carrying and storing and can be quickly and easily unfolded and set up for preparation of any kind of food by use of charcoal, gas, electric heat, wood or the like.

2. Description of the Prior Art

Numerous prior art devices have been proposed for cooking, baking, broiling and/or barbecuing outdoors. Typical such devices are disclosed, for example, in U.S. Pat. Nos. 2,419,674; 2,842,044; 3,101,080; 3,330,204; 3,800,777; 4,106,473; 4,208,959; 4,627,410; 4,800,865; and 4,889,972. Such devices are normally designed to use only one type of fuel. Additionally most of such units are bulky and difficult or impossible to transport. While such units are usually adequate for use around the home they are not practical for use at a beach, a park or the like. Conventional units of this type are not designed to be collapsed and, therefore, they likewise occupy too much space when stored or shipped. Furthermore, most outdoor cooking devices are not universal and can only be used to prepare food in one way (e.g. grilling). They are not capable of cooking liquid foods, such as soup or chili. Most of the known devices are heavy, and complicated in construction and expensive to manufacture, and frequently use complicated regulators for adjusting or shifting the heights of a grill—using numerous components which often fail. A height adjustment regulator in a portable grilling device is disclosed in U.S. Pat. No. 4,226,177 which, however, has similar disadvantages and limitations above set forth.

Devices intended to be portable are described in U.S. Pat. Nos. 2,827,846 and 3,641,922. The cooking grills disclosed in these patents are intended to be used over an open fire and cannot be collapsed after use but must disassembled into a number of different parts which are themselves bulky and may be misplaced to render the grill useless the next time that it has to be used.

In U.S. Pat. No. 3,064,637, a portable barbecue is described which includes a wire grid or grill to which is pivotally connected end leg members carrying resilient end plates adapted to interlock with the grill to secure the legs in an erect position. End plates serve as windbreaks and support the fire pan at selected heights from the grill. However, the unit does not provide windbreaks from the front or rear of the unit nor does it provide for any method of cooking other than grilling. Also, while the unit collapses, the legs are bent to accommodate the bulky fire pan, which sets a minimum dimension for the collapsed unit. Also, the grill and griddle plate which can be placed over the grill are fixed in height and the only way to change their distance from the fire pan is to manually handle the fire pan and move it to different ledges on the end plates. However, since the end plates depend for their stability on the movable legs a potentially dangerous condition can be created if the fire pan and the coals thereon become dislodged.

In U.S. Pat. No. 4,508,096, a portable cooker is disclosed which includes a fire pan, a cover and system of end and side plates in addition to the grill. All these parts separate and can be assembled for use by means of fasteners. Not only can parts be misplaced or lost but the fire pan and cover occupy a considerable amount of space and cannot be collapsed. These components, therefore, likewise limit the compactness of the unit for storage or shipment.

In U.S. Pat. No. 4,526,158, a portable barbecue is described which is intended to facilitate assembly and disassembly. The patent contains a discussion of prior art portable barbecues and their deficiencies. The unit of this patent, however, like most prior portable units, includes a deep pan, in this case a drip pan, which limits the compactness of the collapsed unit. Also, the unit is intended to be used directly over a ground campfire and does, not as such, include a fire pan or grate. This significantly limits its flexibility or versatility and, therefore, its usefulness. The same is true of the cooking device of U.S. Pat. No. 3,858,496 which, while it is relatively simple in construction does not have the universality of the device contemplated herein, and merely serves as a single level spacer for a food support above an open fire.

SUMMARY OF THE INVENTION

Accordingly, it is an object of the present invention to provide a grill which does not have the disadvantages inherent in prior art grills of this type, It is another object of the invention to provide a grill which is simple in construction and economical to manufacture.

It is still another object to provide a grill which is lightweight and portable.

It is yet another object of the invention to provide a grill which can be collapsed to occupy little space for traveling and shipping.

It is a further object of the invention to provide a grill which can use most fuels, including coal, gas, electricity and wood.

It is still a further object of the invention to provide a grill which is universal and can be used to prepare foods in many different ways, including broiling, baking, cooking, grilling and the like.

It is yet a further object of the invention to provide a grill which is easy to use and convenient to set up.

It is an additional object of the invention to provide a grill which does not require separate components or parts or tools for assembly.

It is still an additional object of the invention to provide a grill which incorporates means for creating a draft through the fire grate.

It is yet an additional object of the invention to provide a grill of the type suggested in the above objects which disposes of ashes thereby preventing the ashes from being blown onto the food.

It is a further additional object of the invention to provide a grill which allows for easy adjustability of the distance between the food supporting surface from the fire pan.

It is a further additional object of the invention to provide a portable cooking device which can be used both with a grill and an open fire without a grill to broil food, such as with skewers or spits.

It is also an object to provide a portable device having similar features and advantages to thoses suggested above but which can be assembled from an inexpensive and disposed after use.

In order to achieve the above objects as well as others which will become evident hereafter the portable universal cooking grill of the invention comprises a generally rectangular bottom wall which defines mutually orthogonal first and second pairs of spaced edges. A first pair of walls are provided which have upper and lower edges having lengths substantially equal to the first pair of edges. A second pair of walls are provided having upper and lower edges having lengths substantially equal to the second pair of edges. Hinges and springs are provided for movably mounting the first pair of walls along their lower edges to said first pair of edges and for movably mounting the second pair of walls along their edges to said second pair of edges to provide a knock-down enclosure formed by the bottom wall closed about its perimeter by said first and second pairs of walls and open at the top opposite the bottom wall in the operative condition of the grill when the first and second pairs of walls are erect and substantially normal to the plane of said bottom wall. Hinges permit said walls to collapse to positions proximate to and substantially co-planar with the bottom wall while the springs automatically open the walls of the grill when unlocked to prepare the grill for use. Stops on the walls are provided for maintaining the first and second pairs of walls in an erect condition during use of the grill. Removable food supporting devices are provided which are positionable above the bottom wall for supporting food to be heated. In this manner the first and second pairs of walls can be collapsed to render the grill portable and easily storable when not in use.

Although the above summary of the invention sets forth the broader aspects of the invention, numerous other, more specific features of the invention are intended to represent different scopes or levels of the invention.

BRIEF DESCRIPTION OF THE DRAWINGS

The present invention will become more fully understood from the detailed description given herein below of presently preferred embodiments, and the accompanying drawings are given by way of illustration only, and thus are not limiting of the present invention, and wherein:

FIG. 2 is a cross-section of the grill shown in FIG. 1, taken along line 2—2, to show the details of the spring which urges the grill to expand or become erect;

FIG. 3 is a cross-section of the grill shown in FIG. 2, taken along line 3—3, to show the details of the mounting of the spring;

FIGS. 4A and 4B are side elevational and top plan view of the spring of FIGS. 2 and 3;

FIG. 5 is fragmented cross-sectional view of the grill shown in FIG. 1, taken along line 5—5, to show the details of the ventilating slots or louvres;

FIGS. 6A-6C are side and end elevational views of a skewer which can be used with the grill of FIG. 1;

FIGS. 7A and 7B are top plan and side elevational views, respectively, of a grill tray or rack which can be used with the grill of FIG. 1;

FIGS. 8A and 8B are top plan and side elevational views, respectively, of a pan dish tray and which can be used with the grill of FIG. 1;

FIG. 9 is a bottom plan view of the grill shown in FIG. 1, showing the supporting legs folded or collapsed;

FIG. 10 is a bottom plan view of the grill shown in FIG. 1, showing the details of the bottom wall including the reinforcing ribs thereof and portions of hinges;

FIG. 10A is a cross-section of the wall shown in FIG. 10, taken along line 10A—10A to show the details of wall stops for maintaining the side walls in vertical positions during use;

FIG. 10B is a cross-section of the wall shown in FIG. 10, taken along line 10B—10B to show the details of the hinge;

FIG. 10C is a cross-section of the wall shown in FIG. 10, taken along line 10C—10C to show the details of the reinforcing ribs;

FIG. 10D is a cross-section of the wall shown in FIG. 10, taken along line 10D—10D to show the details of the groove for receiving the spring shown in FIGS. 4A, 4B;

FIG. 11A is a cross-section of the grill shown in FIG. 1, taken along line 11A—11A to show the details of the latch;

FIG. 11B is a cross-section of the latch shown in FIG. A, taken along line 11B—11B to show additional details of the latch;

FIG. 12A is a cross-section of the grill shown in FIG. 1, taken along line 12A—12A to show the details of the lock plate which engages the latch of FIGS. 11A, 11B;

FIG. 12B is a front elevational view of the snap lock plate shown in FIG. 12A;

FIG. 13A is a top plan view of another embodiment of the grill of FIG. 1, which utilizes gas burners;

FIG. 13B is a top plan view of still another embodiment of the grill of FIG. 1, which utilizes electric heaters;

FIG. 15A is a longitudinal section of the grill shown in FIG. 1, additionally showing a spit mounted on the grill for supporting food to be prepared such as barbecuing a whole chicken or the like;

FIG. 16A is similar to FIG. 1, but showing a further, disposable embodiment of the invention formed of a unitary blank folded about fold lines;

FIG. 16B is a cross-section of the grill shown in FIG. 16A, taken along line 16B—16B to show the details of the ridge for supporting the grill tray;

FIG. 17 is a perspective view of a support stand for supporting the grill shown in FIG. 16A, and for serving as a basket for accessories when not supporting the grill and during transportation.

DESCRIPTION OF THE PREFERRED EMBODIMENTS

Figure 1A:
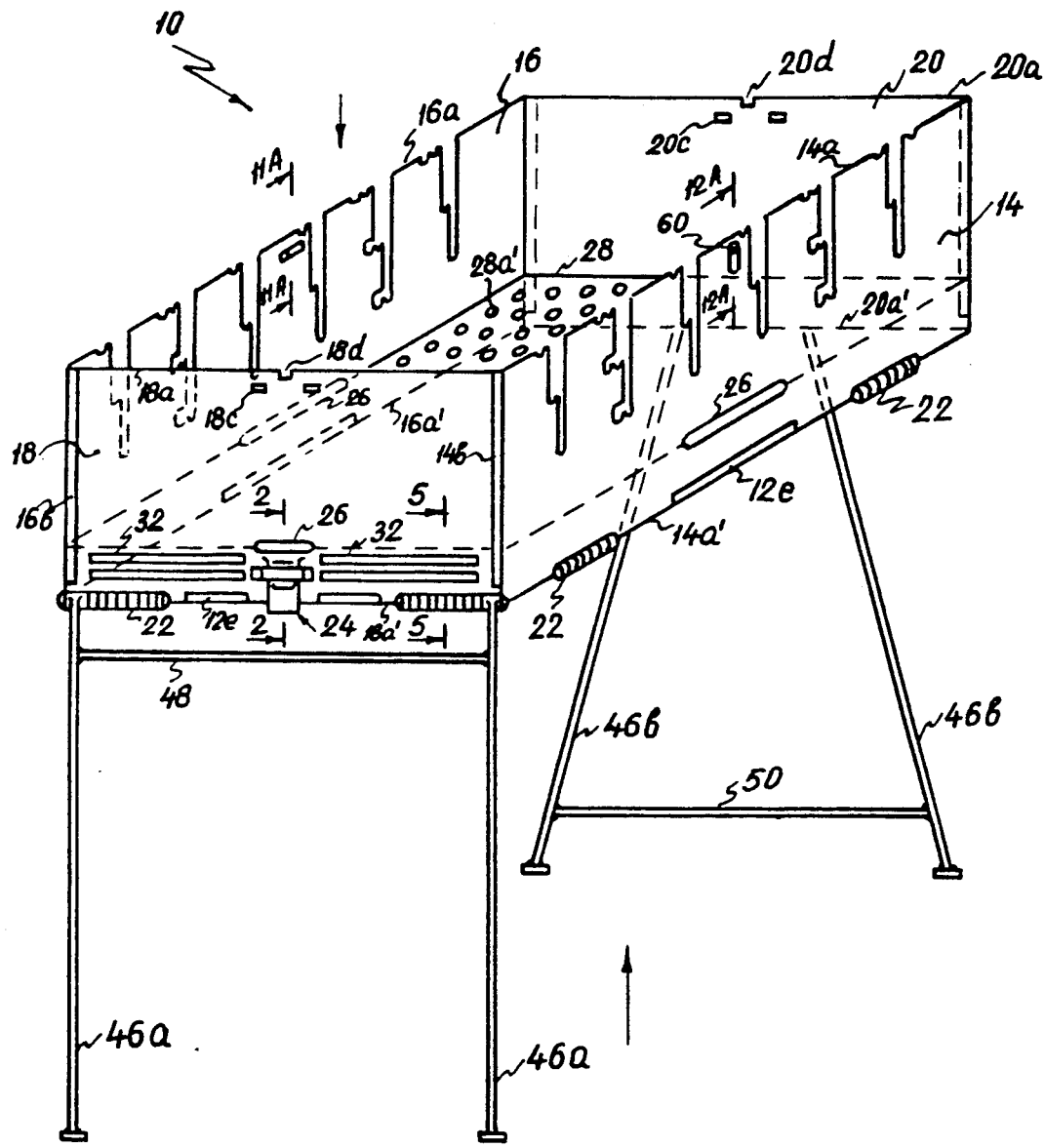
FIG. 1A is a perspective view of a portable universal cooking grill in accordance with the present invention, shown in an erect condition ready for use but without accessories.
Figure 1B:
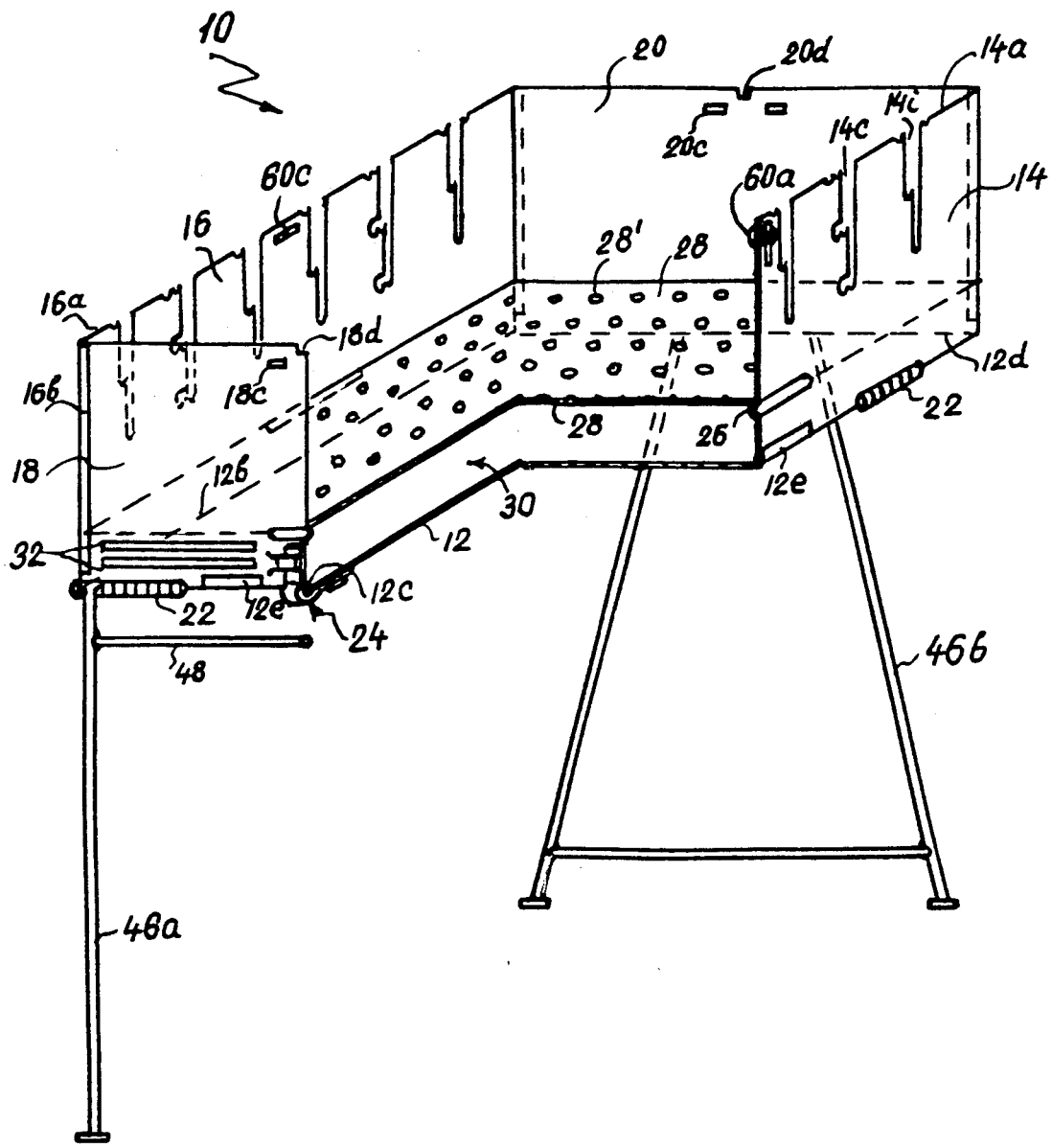
FIG. 1B is similar to FIG. 1A, but showing the upper part of the grill sectioned to show the details of the fire grate and the ash-receiving compartment.

Referring now specifically to the drawings, in which the identical or similar parts are designated by the same reference numerals throughout, and first referring to FIGS. 1A and 1B, one embodiment of a grill in accordance with the present invention is generally designated by the reference numeral 10.

Figure 14:
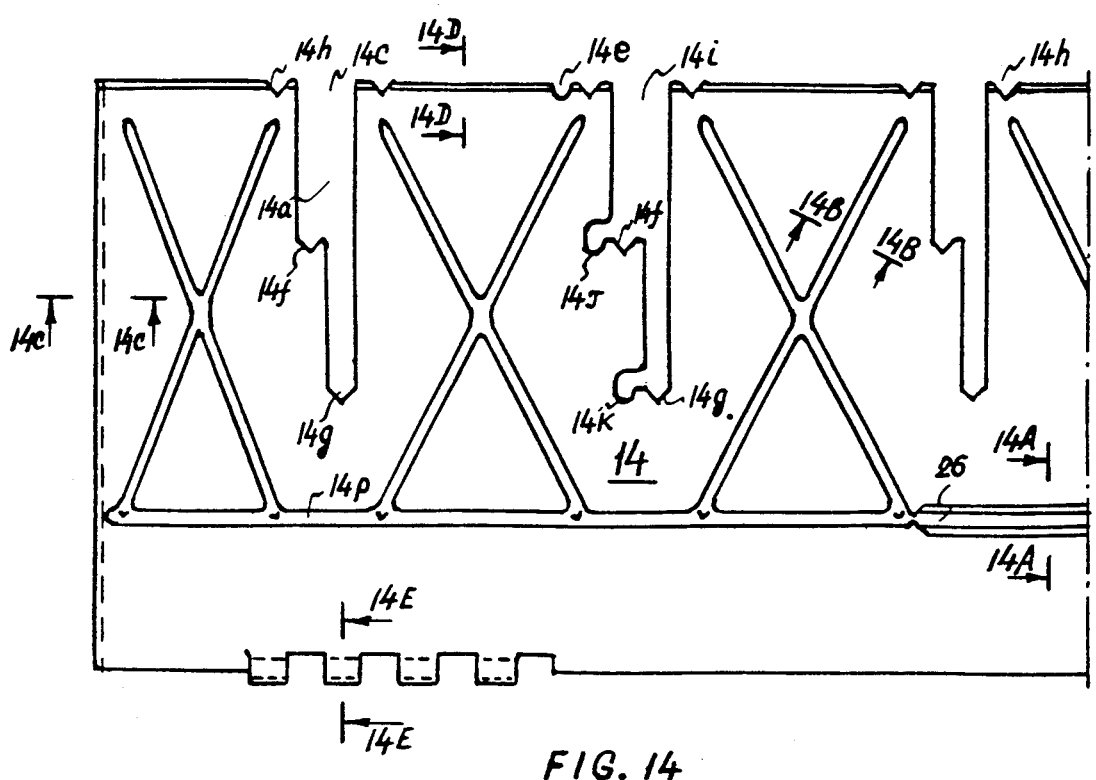
FIG. 14 is an enlarged, fragmented side elevational view of a side wall of the grill of FIG. 1, showing the details of the grooves or slots for supporting the grill tray, skewers, bowl and pan at different levels.
Figure 14A:
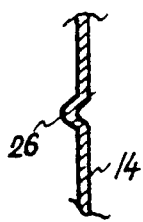
FIG. 14A is a cross-section of the wall shown in FIG. 14, taken along line 14A—14A to show the details of the fire grate supporting ridges.
Figures 14B, 14C:
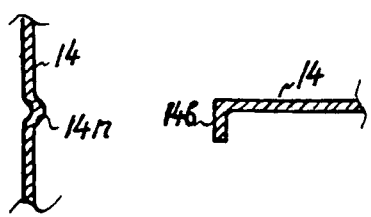
FIG. 14B is a cross-section of the wall shown in FIG. 14, taken along line 14B—14B to show the details of the reinforcing ribs.
FIG. 14C is a cross-section of the wall shown in FIG. 14, taken along line 14C—14C to show the details of the wall stops which maintain associated walls in vertical positions during use.
Figure 14E:
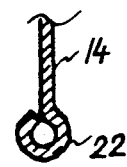
FIG. 14E is a cross-section of the wall shown in FIG. 14, taken along line 14E—14E to show the details of the knuckles of the hinges.

The grill 10 has a rectangular bottom wall 12 defining mutually orthogonal pairs of edges, namely edges 12a, 12b and 12c, 12d. A first pair of side walls 14, 16 have upper and lower edges 14a, 14a' and 16a, 16a', respectively. A second pair of end walls 18, 20 have upper and lower edges 18a, 18a' and 20a, 20a', respectively. The aforementioned upper and lower edges have lengths substantially equal to the associated edges of the bottom wall to which they are attached by conventional hinges 22, as shown. Sections of the hinges are shown in FIGS. 10B and 14E.

The hinges 22 are an example of means to movably mount the walls 14, 16, 18 and 20 to the bottom wall 12 to provide a knock-down enclosure formed by the bottom wall 12 when closed about its perimeter by the side and end walls, and open at the top opposite the bottom wall in the operative condition of the grill shown in FIG. 1. In this condition the side and end walls are extended or erect and substantially normal to the plane of the bottom wall 12. The hinges permit the side and end walls to collapse to positions proximate to and substantially co-planar with the bottom wall, as will be more fully described below.

In order to insure that the side and end walls 14, 16 and 18, 20, respectively, stop in the erect positions shown in FIG. 1 and limit their movements outwardly there are provided retaining means for maintaining the walls in the erect positions during use of the grill 10. Such retaining means includes spaced, upwardly directed tabs or stops 12 which are integral with and normal to the bottom wall 12 at the edges 12c, 12d thereof to maintain the walls 14, 16, 18, 20 in vertical positions during use. The side walls 14, 16 are similarly provided with inwardly directed tabs or stops 14b, 16b, respectively, one on each vertical edge of the side walls, which are integral with and normal to the side walls and dimensioned to engage the end walls 18, 20 as shown.

Referring to FIGS. 1A, 2-4, 10A, and 14C one feature of the invention is the automatic opening of the grill to set up for use with minimal manual labor. Towards this end, there are provided biasing means generally designated by the reference numeral 24, shown as a flat leaf spring having flat portions 24a, 24b between which there is a curved portion 24c. The flat portion 24a is inserted into a loop or retaining strap 18b formed on the wall 18, such as by punching it out when the wall 18 is die cut. Similarly, the flat portion 24b is inserted into a loop or retaining strap 12f formed in the bottom wall 12. Since the spring 24 must be flexed about the curved portion 24c to bend it to the condition shown in FIG. 2, the spring is under stress and creates restoring forces which seek to move the end walls outwardly. With the end walls 18, 20 collapsed against the bottom wall 12 and with the side walls 14, 16 collapsed against the end walls 18, 20, it will be clear that the leaf or blade springs 24 will seek to restore the end walls 18, 20 to their erect positions. In doing so, the end walls will urge the side walls to move to the erect positions. The side walls will move until they abut against the stops 12e and the end walls will reach their final open or extended positions when they abut against the stops 14b, 16b.

The side walls 14, 16 are provided with support ridges 26 to support a fire grate 28. The ridges 26 may also be placed on the end walls or on all the upright walls. Either spaced ridges 26 may be used, as shown, or a continuous ridge may be used extending across the width of the walls. Referring to FIGS. 1, 1B, 14, 14A and 15A, the support ridges are shown uniformly spaced from the bottom wall 12 and directed inwardly. When the fire grate 28 is supported on the ridges 26 there is formed a compartment 30 which, for example, can receive ashes that fall through holes 28' in the fire grate. Also referring to FIG. 5, the end walls 18, 20 are provided with slots 32 in the region between the support ridges 26 and the bottom edges of the end walls to allow air to enter the compartment 30 and provide ventilation through the fire grate and thereby increase the efficiency of burning of certain fuels, such as wood placed on the fire grate. In FIG. 5 the slots 32 are shown as louvres 34 which are punched out or die cut in the end walls and rotated or turned 45°.

Figure 15A:
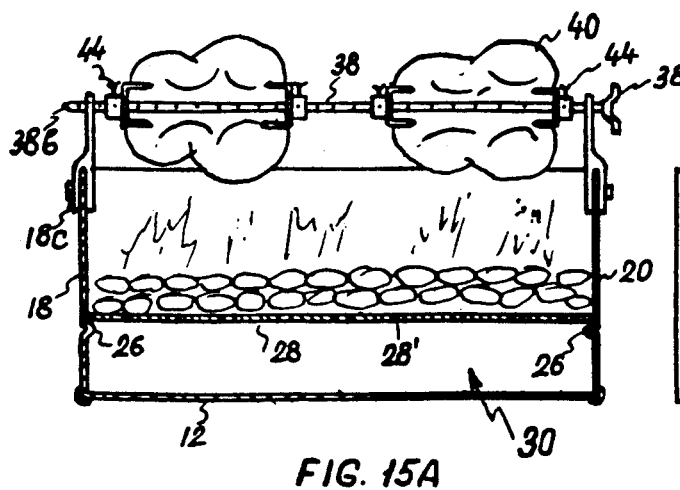
Figure 15B:
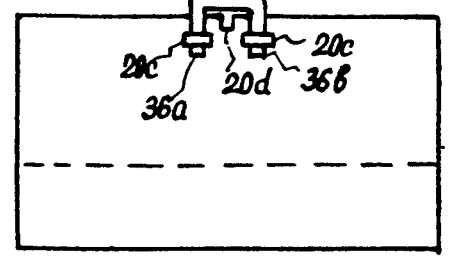
FIG. 15B is an end elevational of the unit shown in FIG. 15A, showing the details of the spit supporting hardware.

Suitable food supporting members may be used positionable above the bottom wall 12 for supporting food to be heated. By way of example, referring to FIGS. 15A and 15B, support adapters 36 are provided on each of the end walls 18, 20 which fit over the upper edges thereof as shown. The adapters 36 have lower legs 36a, 36b which fit into loops or straps 18c, 20c, and upper spaced projections 36c, 36d which between them define a rectangular space dimensioned to receive a spit 38 of like cross section and which extends between two adapters on the opposing end walls. The spit 38 has a handle 38a at one end and a point 38b at the other end, and holes 38c along its length so that food, such as poultry 40, can be held in place with blocks 42 by pins 44. With this arrangement, the spit 38 can be moved to anyone of four different positions about its axis.

Foldable legs 46 may be pivotally mounted about the pins of the hinges 22, or in any other conventional manner, and may be reinforced by means of rods or members 48, 50 as shown. As shown in FIG. 9, the legs on opposite sides of the grill are configurated so that the legs 46a are positioned outside and the legs 46b so that the legs can be folded into a common plane to minimize storage or shipping volume.

In addition to the spit 38, food can be prepared on a grill tray 52 provided with transverse wires 52a, 52b and parallel wires 52c on which thermally insulating handles 54 are mounted, as shown in FIGS. 7A and 7B. The dimensions of the grill preferably correspond with those of the bottom wall 12 with the wires 52a-52c projecting beyond the side walls to minimize the temperature of the handles 54, and to allow for adjustment of the height of the grill 52. Advantageously, protuberances forming legs 52d are provided on the lower sides of the grill 52 so that once the grill tray is removed it can be placed directly on a table or serving surface. In FIGS. 8A and 8B a pan and bowl 56 of two or more sections is shown which can be used to heat more liquid foods such as soup. The surfaces 56a can be provided with a non-stick surface, and a partition 56b divides the pan into two compartments 56c. The pan may be made from any material such as aluminum. The pan or bowl 56 can also be used as a cover when reversed or turned upside-down in close proximity to the grill. This can be useful to increase the temperature in the device and use it as an oven to bake food.

For smaller items of food, shish-kebab, shashlik, etc. special skewers 58 shown in FIGS. 6A–6C can be used. The skewers 58 include elongate shafts 58a pointed at one end 58b and a handle 58c at the other end. Proximate to the handle 58c the shaft is twisted into a spiral 58d wherein the spiral surface 58e is provided along the outer edges thereof with slots 58f which are equally spaced, as best shown in FIG. 6C. Six slots 58f are provided over the effective circumference of the spiral, so that the slots are spaced from each other 60° apart. The width of the slots 58f are selected to correspond to the thickness of the side and end walls so as to receive portions thereof to lock the positions of the skewers in any one of the six positions when supported either by the side or end walls.

The walls of the grill are made as thin as possible to minimize the weight thereof. Since the walls may thereby be rendered flexible, the bottom wall 12 is provided with cross ribs 12g (FIG. 10) which reinforce the bottom wall, as shown in FIGS. 10 and 10C. Similarly, the side walls 14, 16 are provided with reinforcing ribs 14m, 14n, as shown in FIGS. 14 and 14B. The end walls 18, 20 may also be provided with such ribs.

Figure 14D:
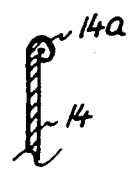
FIG. 14D is a cross-section of the wall shown in FIG. 14, taken along line 14D—14D to show the details of the upper edge of the wall beyond the regions of the slots.

Although the skewers or spits may be placed directly on the upper edges of the side or end walls (FIG. 14D), the side walls are advantageously provided with a system of indentations and slots 14C which allows for height adjustments of the food being prepared above the heating surface, as best shown in FIG. 14. V-shaped indentations 14h are, for example, provided at the upper edges of the side walls. Slots 14c alternate with slots 14i along the width of the side walls. The slots 14c two level slots, with a V-shaped indentation 14f at an intermediate level and a V-shaped indentation 14g at a lower level. The indentations 14h, 14f and 14g are slightly offset from each other and aligned with corresponding slots and indentations on the opposing side wall to that, for example, skewers 58 can easily be selectively moved to any one of the three available levels. The slots 14i are similar to the slots 14c, except that adjacent to each V-shaped indentation there is also provided a circular recess 14l, 14j and 14k, as shown which better receive the wires 52a, 52b of the grill tray 52 and the pan or dish tray 56.

Referring to FIGS. 11A, 11B, 12A and 12B, a lock 60 is shown which locks the two side walls to each other in the collapsed condition of the grill, against the action of the springs 24. The lock 60 includes a plate 60a pivotally mounted on the wall 14 by means of rivet or pin 60b. On the other side wall 16 there is provided a tab 60c which can be die cut or punched out of the wall and offset to provide a space 60d to receive the plate 60a with little clearance and, preferably, in pressure engagement to prevent inadvertent opening of the lock 60 when the unit is closed. The tab 60c may be curved in section to stiffen or strengthen it.

The grill 10 may be used with almost any type of fuel used for this purpose. When charcoal briquettes are used they are placed on the fire grate 28. Referring to FIG. 13A, there is shown a variant embodiment which uses gas. In this case, the fire grate 28 may be omitted and replaced by gas burners 62 supported in suitable holes in the end walls 18,20 by means of sleeves or fittings 64. The burners 62 are coupled to a gas tank 66 through a gas valve 68, in a conventional manner. The gas burners can be replaced by electric burners 70 (FIG. 13B), which may be similarly mounted and electrically coupled to lines 72 by means of transformer 74.

Figure 18:
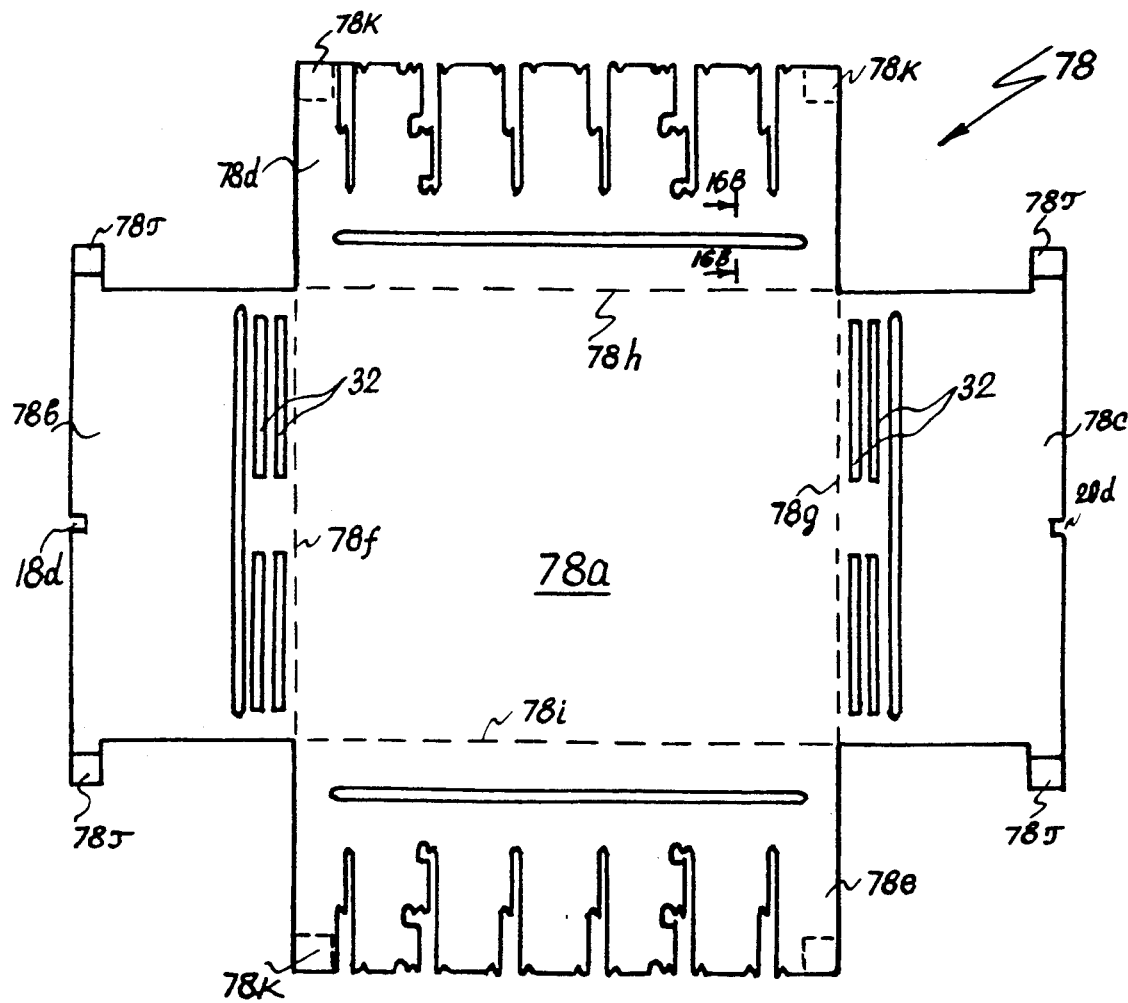
FIG. 18 is a plan view of the blank used to make the disposable grill shown in FIG. 16A prior to assembly.

Referring to FIG. 16A, there is shown a further embodiment 76 of the grill which constructed of an integrally formed sheet of semi-rigid material provided with a heat resistant and flameproof surface facing the interior of the enclosure. Referring to FIG. 18, there is shown a blank 78 used to construct the grill 76. The blank 78 includes a rectangular central section 78a, which corresponds to the bottom wall 12 of the assembled unit. Lateral panel 78b and 78c are connected at opposite ends to the section 78a at fold or weakened lines 78f and 78g, respectively. Similarly, side panels 78d and 78e are connected at opposite edges of the section 78a at fold or weakened lines 78h and 78i. The panels 78b, 78c correspond to the end walls 18, 20 and the panels 78d, 78e correspond to the side walls 14, 16. The panels 78b, 78c include extension strips 78j which can wrap around to make contact with corner portions 78k on the panels 78d, 78e. The contacting surfaces 78j and 78k are provided with any suitable means for attachment, such as male and female hook and loop fasteners (e.g. sold under the brand name "Velcro") or sticky tape. The panels may otherwise be provided with the same details or features as described in connection with the side and end walls of the grill 10 (e.g. ridges 26 in FIG. 16B).

With the grill 78 there is advantageously used a support stand 80 shown in FIG. 17, which includes an upper wire basket 82 pivotally connected to wire legs 84 by means of wire hinges 86 or in any other suitable manner. The height of the basket 82 should be minimal for support and to avoid interference with the height adjustment slots in the side walls 14, 16.

The specific material used for the blank 78 is not critical as long as it exhibits the desired properties of strength and fire resistance. A stiff cardboard coated with a metallic fire resistant sheet material such as foil adhesively attached to the cardboard, for example, could serve the purpose and be sufficiently inexpensive to make the grill 76 disposable after one or a small number of uses. The foil can be provided on one or both sides of the cardboard or other suitable material.

The invention being thus described, it will be obvious that the same may be varied in many ways. Such variations are not to be regarded as a departure from the spirit and scope of the invention, and all such modifications as would be obvious to one skilled in the art are intended to be included within the scope of the claims that follow.

What is claimed is:

1. Portable universal cooking grill comprising a generally rectangular bottom wall defining mutually orthogonal first and second pairs of spaced edges; a first pair of walls having upper and lower edges having lengths substantially equal to said first pair of edges; a second pair of walls having upper and lower edges having lengths substantially equal to said second pair of edges; means for movably mounting said first pair of walls along their lower edges to said first pair of edges and for movably mounting said second pair of walls along their edges to said second pair of edges to provide a knock-down enclosure formed by said bottom wall closed about its perimeter defined by said first and second pairs of edges and open at the top opposite said bottom wall in the operative condition of the grill when said first and second pairs of walls are erect and substantially normal to the plane of said bottom wall, said means for movably mounting permitting said walls to collapse to positions proximate to and substantially coplanar with said bottom wall; retaining means for maintaining said first and second pair of walls in an erect condition during use of the grill; a removable food supporting member positionable above said bottom wall for supporting food to be heated and including a skewer adapted for mounting proximate to the upper edges of one of said first and second pairs of walls; and positioning means for selectively positioning and maintaining the selected position of said skewer about a longitudinal axis thereof, whereby said first and second pairs of walls can be collapsed to render the grill portable and easily storable when not in use.

2. Portable cooking grill as defined in claim 1, wherein said means for movably mounting comprises hinges.

3. Portable cooking grill as defined in claim 1, further comprising a grate, and support means for supporting said grate at a position between said bottom wall and said food supporting member.

4. Portable cooking grill as defined in claim 3, wherein said grate has dimensions to be received between said first and second pairs of walls with little clearance during use of the grill and said support means comprises inwardly directed protuberances or ridges on at least a pair of said walls.

5. Portable cooking grill as defined in claim 3, wherein said grate and said walls together define a compartment; and wherein at least one of said first and second pairs of walls is provided with ventilation means to provide a draft of air to flow through said compartment and grate.

6. Portable cooking grill as defined in claim 5, wherein said ventilation means comprises slots.

7. Portable cooking grill as defined in claim 1, wherein said food supporting member comprises a grill tray.

8. Portable cooking grill as defined in claim 1, wherein said food supporting member comprises a deep dish tray.

9. Portable cooking grill as defined in claim 1, wherein said food supporting member includes handles projecting beyond said first and second pairs of walls to facilitate gripping thereof when the food being cooked has been prepared.

10. Portable cooking grill as defined in claim 9, further comprising legs on said food supporting means to allow same to be removed from the grill and directly placed on a table or other serving surface.

11. Portable cooking grill as defined in claim 1, wherein said food supporting member is mountable, on said first and second pairs of walls.

12. Portable cooking grill as defined in claim 11, wherein said first and second pairs of walls have the same heights and wherein at least one of said first and second pairs of walls is provided with at least one pair of corresponding slots at said upper edges thereof for receiving and supporting portions of said food supporting member at a height below the upper edges of said first and second pairs of walls in the erect positions thereof, whereby the food is exposed to heat more intense than the heat at and above said upper edges of said walls.

13. Portable cooking grill as defined in claim 12, wherein a plurality of pairs of corresponding slots are provided.

14. Portable cooking grill as defined in claim 12, wherein said at least one pair of corresponding slots are configured to provide a plurality of stepped levels for carrying said portions of said food supporting member relative to said bottom wall.

15. Portable cooking grill as defined in claim 1, wherein at least one of said walls is provided with reinforcing ribs to strengthen and minimize flexure in respective walls.

16. Portable cooking grill as defined in claim 1, further comprising heating means for generating heat between said bottom wall and said food supporting member.

17. Portable cooking grill as defined in claim 1, wherein said walls are integrally formed of a blank of semi-rigid material provided with weakened or fold lines where said lower edges are joined to said first and second pairs of spaced edges, said blank being resistant to hot temperatures and fire and forming, when assembled, a disposable grill.

18. Portable cooking grill as defined in claim 17, further comprising a stand for receiving and supporting said blank in an erect condition above the ground or serving surface.

19. Portable cooking grill as defined in claim 18, wherein said blank comprises non-metallic sheet material coated with a metallic heat resistant and flameproof covering sheet facing the interior of the enclosure.

20. Portable cooking grill as defined in claim 1, further comprising biasing means for biasing said first and second pairs of walls to an expanded or erect condition suitable for use; and locking means for selectively locking said first and second pairs of walls against the action of said biasing means.

* * * * *